April 14, 1953
J. B. JARMIN
2,634,568
STALK CUTTING DEVICE
Filed Aug. 25, 1947
3 Sheets-Sheet 1
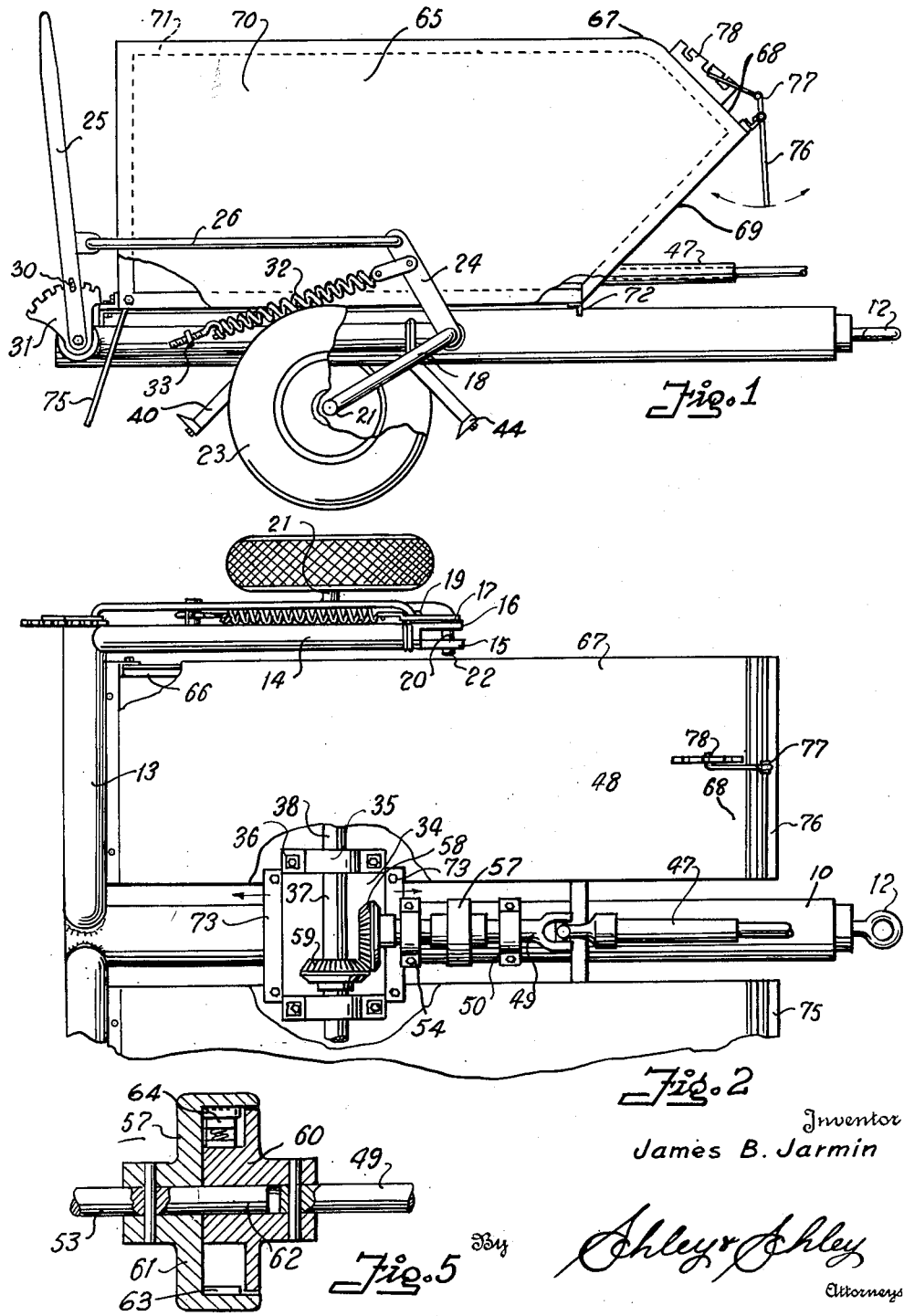
Inventor
James B. Jarmin
By Shley & Shley
Attorneys

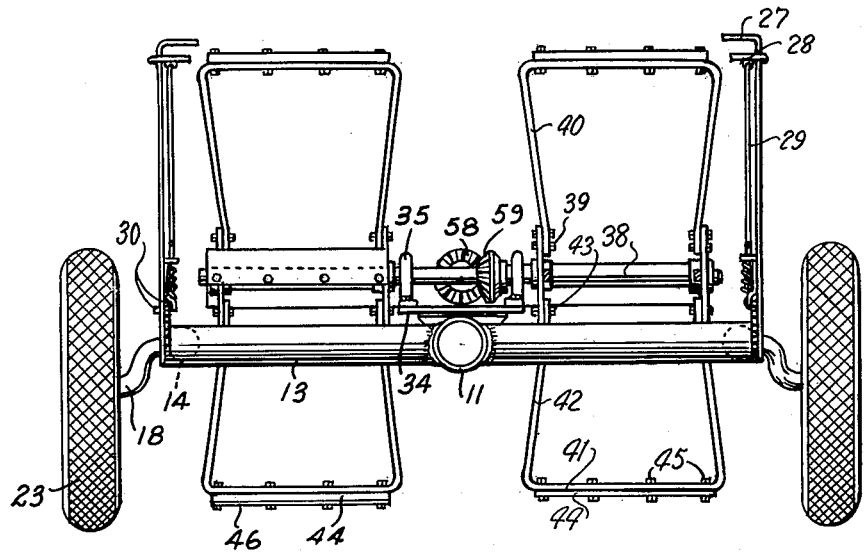
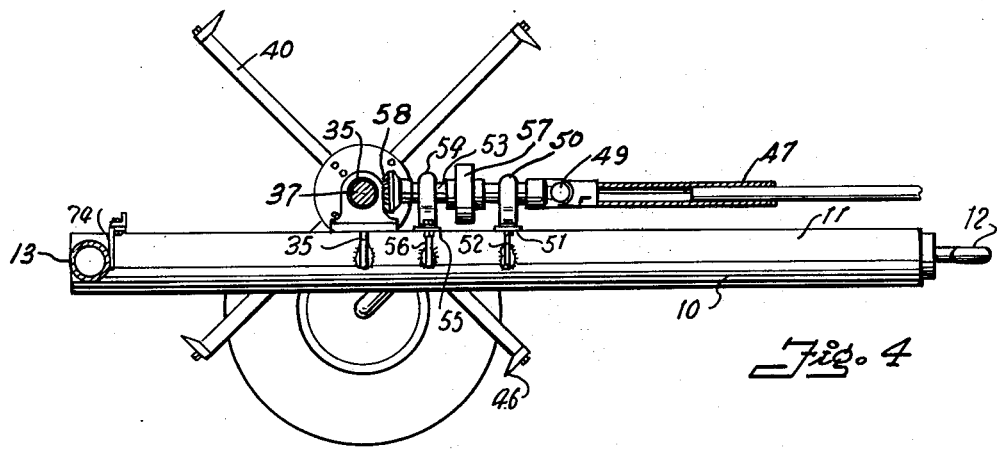
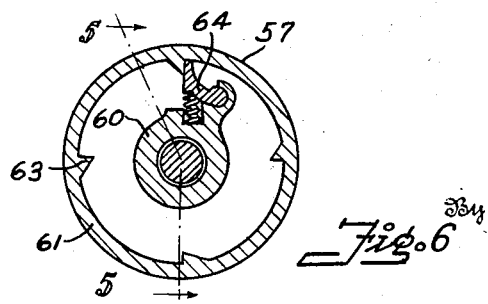

April 14, 1953
J. B. JARMIN
2,634,568
STALK CUTTING DEVICE
Filed Aug. 25, 1947
3 Sheets-Sheet 3
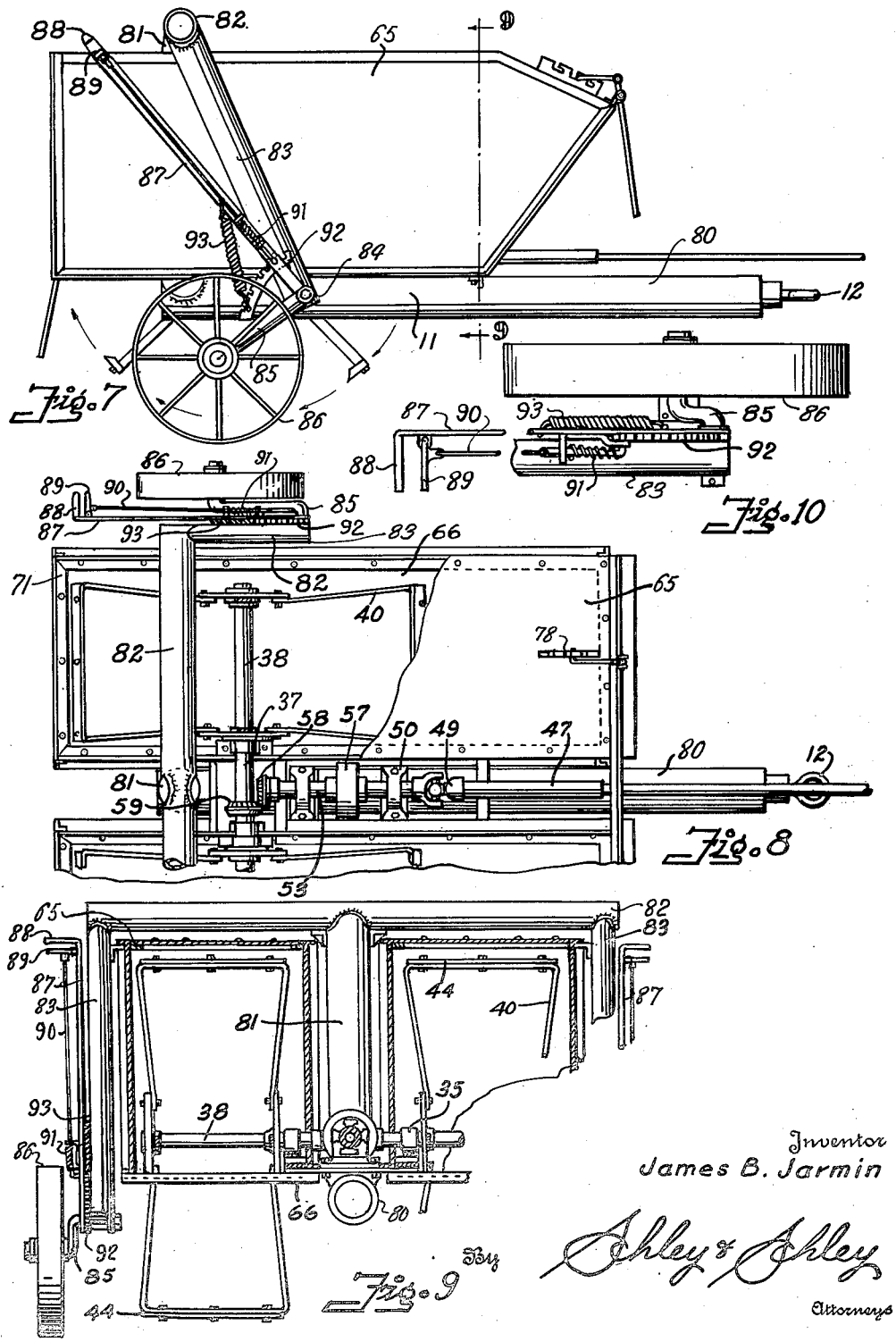

Patented Apr. 14, 1953

2,634,568

UNITED STATES PATENT OFFICE 2,634,568

STALK CUTTING DEVICE

James B. Jarmin, Dallas, Tex.

Application August 25, 1947, Serial No. 770,377

2 Claims. (Cl. 55—118)

This invention relates to new and useful improvements in stalk cutting devices, and in particular to cotton stalk cutters, or shredders.

The invention is directed primarily to a device for cutting the stalks of a standing crop into relatively short lengths and simultaneously scattering the pieces of the stalks in a broadcast manner over the surface of the ground to act as a mulch or to be plowed under while the stalk is green for fertilizing and soil improving purposes.

One object of the invention is to provide a cutting device having a plurality of rapidly moving cutter blades which thoroughly cut and shred a standing crop while, at the same time, scattering the pieces of the plants thus cut in a widespread or broadcast manner over the surface of the ground.

Another object of the invention is to provide an improved cutting device having a pair of cutter assemblies rotating in a vertical plane, the pair of assemblies being spaced apart a distance equal the distance between adjacent rows of the standing crop whereby a pair of contiguous crop rows may be cut and spread at one time.

An important object of the invention is to provide an improved chopping device having a plurality of cutters supported upon a unitary, longitudinally-extending, frame member whereby the simplicity and ease of construction of the device is enhanced while, at the same time, a rigid and sturdy supporting frame work is provided.

A still further object of the invention is to provide an improved cutting device adapted to be driven from the power take-off of the usual farm tractor, and wherein provision is made for permitting the cutter assemblies of the cutting device to override the power drive and prevent injury to the device upon a sudden stoppage of rotation of said power drive.

Yet another object of the invention is to provide an improved chopping device having provision for adjusting the cutting knives of the cutting assemblies to accommodate various crop and soil conditions, and also having provision for protecting the operator of the tractor which draws the device from debris and cuttings thrown out by the cutter blades in the course of their rotation.

A particular object of the invention is to provide an improved cutting device having a T-shaped frame with wheel supports carried by the ends of the bar of the T, said supports making provision for the mounting of ground wheels and providing an unobstructed area in which the cutter assemblies may rotate and at the same time completing a one-piece, unitary frame which, while extremely simple in structure is, at the same time, very rigid and durable and has a minimum of structural elements.

A construction designed to carry out the invention will be hereinafter described together with other features of the invention.

The invention will be more readily understood from a reading of the following specification and by reference to the accompanying drawings, wherein an example of the invention is shown, and wherein:

Fig. 1 is a side elevation, partly broken away, of a cutting device constructed in accordance with this invention, Fig. 2 is a plan view, partly broken away, of one side of the device, Fig. 3 is a rear elevation with the housings removed, Fig. 4 is a vertical, longitudinal, sectional view, Fig. 5 is a longitudinal, sectional view of the override connection taken along line 5—5 of Fig 6, Fig. 6 is a vertical, transverse, sectional view of the override connection taken at right angles to the drive shaft of the cutting device as illustrated in Fig. 4, Fig. 7 is a side elevation of a modified form of the cutting device, Fig. 8 is a fragmentary plan view, partly broken away, of the modified device, Fig. 9 is a fragmentary, vertical, sectional view taken on the line 9—9 of Fig. 7, and Fig. 10 is an enlarged view of the wheel mounting employed in the modified form.

In the drawings, the numeral 10 designates the frame of a cotton stalk cutter or chopper constructed in accordance with this invention. The frame includes an elongate, horizontal tubular center support or main frame member 11 which may be formed of a length of ordinary pipe or any other suitable material. A suitable tractor hitch 12, which may be of any desired type, is provided upon the forward end of the frame 11, while a horizontal, transverse, cross-frame member 13 is secured by welding or other suitable means to the rearward end of said member 11 (Figs. 2 and 3). The central portion of the cross-frame member 13 is secured to the rearward end of the frame 11 so that the same co-act to form the outline of a T with approximately one-half of the member 13 projecting horizontally and laterally to either side of the rearward portion of said main longitudinal frame member 11. A pair of forwardly-extending, horizontal side frames 14 are secured to the outer ends of the member 13, one of the frames 14 being provided upon each side of the central member 11 and projecting forwardly and horizontally from said member 13 in parallel and horizontal alinement with said frame member 11. In this manner, a unitary frame or support is provided having a principal central frame element (the member 11) with a pair of laterally-projecting frame structures (the frame member 13 and the frames 14) secured upon the rearward end of the main frame element and projecting to each side thereof so as to enclose partially an area on each side of the rearward portion of said main frame element without encumbering or obstructing the space immediately above, below or in front of such space or area.

A supporting bracket 15 is secured upon the forward end of each of the side frames 14, each of the brackets having a pair of spaced, parallel, forwardly-extending ears 16. The ears 16 are disposed in a vertical plane and carry horizontal openings 17 which are in horizontal alinement.

A substantially Z-shaped, cantilever wheel support 18 is provided at each side of the frame 10. The supports 18 include elongate central portions 19 having inwardly-turned studs or trunnions 20 at one end and outwardly turned axles 21 at their opposite ends. The trunnions 20 are received within the openings 17 of the brackets 15 with the balance of the wheel support 18 being positioned outwardly of the side frames 14. The central portions 19 of the wheel supports are thus positioned in a vertical plane parallel to the longitudinal axis of the frame 10 and extend rearwardly and downwardly from the brackets 15, as shown in Figs. 1 and 2. Since the trunnions 20 are free to rotate within the openings 17, the rearward ends of the wheel supports are free to swing in a vertical arc about such openings as a center. A suitable pin 22 extends through the inner end of each of the trunnions within the innermost ear 16 of the brackets 15 in which the support is pivoted so as to prevent outward displacement of said trunnions from the openings 17. The outwardly-extending axle 21 of each of the wheel supports receives a suitable ground wheel 23, whereby the latter are positioned outwardly or laterally with respect to the member 11 and serve to support and space said member a predetermined distance above the surface of the ground.

For controlling the swinging movement of the supports 18 and thereby the spacing of the frame 10 from the ground surface, a suitable elongate arm 24 is secured by welding or by other suitable means to each of the trunnions 20 immediately outward of the outermost ear 16 in which said trunnion is disposed. The arms 24 project at substantially right angles with respect to the supports 18, as shown in Fig. 1 so as to extend upwardly and rearwardly from the trunnions. A pair of elongate operating levers 25 have their lower ends pivotally mounted upon the transverse frame member 13, one of such levers being provided at each outer or lateral end of said frame member. Thus, one of the operating levers is provided for each of the wheel supports 18. The levers 25 are pivotally connected to the upper ends of the arms 24 by elongate links 26, whereby movement of said levers in a vertical arc above the transverse frame member 13 results in swinging of said arms in a vertical arc above the bracket 15 and vertical movement of the axles 21 along with the wheels 23 with respect to the frame 10. The wheel supports 18 and arms 24 thus constitute, in effect, bell crank levers which may be adjusted to position the ground wheels 23 selectively with respect to the frame 10 and thereby regulate and control the vertical spacing of said frame above the surface of the ground.

Each of the levers 25 carries a suitable handle 27 at its upper end and a suitable trigger 28 is pivotally connected to each of the levers adjacent said handles. The triggers 28 are connected through rods 29 to pawls 30 which engage toothed ratchets 31 secured to the transverse frame member 13 adjacent the lower ends of the levers. The pawl and ratchet mechanisms allow the levers 25 to be locked or secured in any desired position so that the ground wheels may arbitrarily be adjusted to the desired height and locked in such position by means of engagement of the pawls 30 with the ratchets 31. A suitable coiled spring 32 is stretched between the upper end of each of the arms 24 and a suitable adjustable bracket 33 affixed to the rearward portion of the side frame 14 with which the arm is associated. Being under tension, the springs 32 tend to move the arms 24 rearwardly so as to move the wheels 23 downwardly, and the net effect of the springs is to counteract to some extent the tendency of the wheels to move upwardly with respect to the frame 10 under the influence of the weight of such frame. Thus, the selective positioning of the levers 25 to raise or lower the frame 10 with respect to the ground level is facilitated and rendered much easier to accomplish. Being adjustable, the brackets 33 allow a certain degree of regulation of the force exerted by the springs 32 to balance very nearly the weight of the frame 10, whereby one man may easily and readily accomplish the desired adjustment of the levers 25 without being required to exert undue force and effort in effecting such an adjustment.

A horizontal mounting plate 34 is secured upon the upper side of the central frame member 11 by welding or other suitable means, the plate being positioned in alinement with and between the ground wheels 23. Suitable gussets 35 extend downwardly from the under side of the plate 34 to the sides of the member 11 for bracing the plate and furnishing additional rigidity and security thereto. A laterally-directed pillow block bearing 35 is secured upon each lateral edge of the plate 34 by suitable bolts 36. The bearings 35 receive an elongate transverse shaft 37 which extends across the width of the frame 10 and has its outer ends terminating in approximate vertical alinement with the inner portion of the side frames 14. The shaft 37 thus constitutes a pair of stub shafts 38 one of which extends laterally and horizontally from each side of the center frame member 11 toward and adjacent the side frames 14 positioned upon either side of said center frame member. Each of the stub shafts 38 has secured thereon a pair of mounting hubs 39, one of said hubs being positioned adjacent the outer end of the shaft while the other is positioned upon the inner portion of the shaft immediately outward of the bearing 35 in which said shaft is supported. A plurality of cutter yokes 40 are secured in equally spaced relation upon the hubs 39, one set of such yokes being provided for each of the stub shafts 38 and being secured to the hubs 39 carried by said shafts.

The yokes 40 are formed of elongate bars or straps having their outer ends bent through slightly more than ninety degrees so as to form a substantially U-shaped structure having a substantially flat center portion or plate 41 with a pair of co-extensive, slightly convergent legs 42 extending one from each end of said plate. The inner or free ends of the legs 42 are secured to the hubs 39 by suitable bolts 43 so that the legs extend radially outwardly from said hubs and position the plate 41 in spaced, parallel relation with respect to the shaft 38. Each yoke has one of its legs secured to one of the hubs 39 carried by one of the stub shafts 38 with the other leg of that yoke being secured to the other hub of that shaft. Thus, each yoke is connected to the hubs of one shaft only and each shaft carries its separate set of yokes.

A cutter blade 44 is secured by bolts 45 to the outer surface of each of the plates 41, the legs 42 of the yokes being of sufficient length as to place said cutter blade in close proximity to the horizontal plane of the ground surface upon which the wheels 23 rest. Of course, as the ground wheels are vertically adjusted with respect to the frame 10, the cutting periphery is moved closer or further away from the ground surface. In this manner, the adjustment of the wheels 23 by means of the levers 25 allows a regulation of the cutting height of said blades. The shafts 38 are adapted to rotate in the same direction as the ground wheels 23 and for this reason the cutting edge 46 of each of the blades 44 is positioned upon the rearward edge of said blade so that the latter accomplish a cutting action when rotating in a clockwise direction as viewed in Fig. 1. Thus, as the shafts 38 are rotated, the blades 44 are caused to pass in successive relation over the surface of the ground and to cut and chop any standing plants or crops which may be projecting thereabove. Each set of yokes 40 represents a cutting cylinder or reel having a plurality of cutting blades which move in a vertical circle as the cutting device is drawn along the crop rows. The shafts 38 are rotated at a relatively high speed so that the blades 44 cut a cylindrical swath as the device advances. Thus, each plant standing in the crop row is cut a number of times as the cutting device moves into engagement therewith. As the device approaches the plants, the uppermost portion of the latter will be lopped off by one of the cutter blades as said blade reaches the vertical elevation of the top of the plant. The following blade will cut another small section from the upper portion of the plant since in the period of time required for the next cutter blade to move into cutting position, the entire cutting device will have moved forwardly a very short distance. In this manner, successive cutting blades each cut a small portion from the plant until the device has moved forwardly to a point wherein the plant directly underlies the shaft 38. At this point, the next cutter moving into a bottom dead center position will cut the remaining small portion left standing of said plant so that only a very short stubble is left in the crop row after the cutting device has passed thereover. Of course, the height of the stubble left will depend upon the closeness with which the blades are set to the surface of the ground.

At the same time that this cutting action is taking place, the relatively high speed of rotation of the shaft 38 will cause the small pieces successively cut from the plant to be thrown tangentially outward from the cutting circle of the blades with considerable velocity, whereby such pieces are scattered and broadcast over a relatively large area. Obviously, because of variations in the individual plants and because of the obstruction of adjoining plants and the air currents set up through the rotation of the blade, such pieces cut from the plant will follow various and sundry directions of travel with the net result of scattering the cut pieces over a relatively large area and in a substantially uniform manner.

It is pointed out that the spacing of the two sets of cutter blades is approximately 30 inches from center to center, this distance being equal to the row spacing most usually and commonly employed for growing crops. Thus, each of the cutter assemblies chops and scatters the plants in one standing row of such plants and, as the device is drawn along the crop rows, two of such rows are simultaneously handled by the machine. Of course, the device may readily be constructed with only one set of chopping blades, or a number, greater than two, of such chopping or cutter blade assemblies may be provided.

For furnishing rotative power to the shaft 37 and thereby the stub shafts 38, a telescoping drive connection 47 extends parallel to and above the center frame member 11. The forward end (not shown) of the driving connection 47 is suitably connected to the power take-off (not shown) of the ordinary farm tractor (not shown). The rearward end of the driving connection 47 is connected through a universal joint 48 with a shaft 49 supported above and in alinement with the frame member 11 by a pillow block bearing 50. The bearing 50 is carried upon a transverse, horizontal plate 51, welded or otherwise secured to the upper surface of the member 11 and reinforced by suitable gussets 52 extending between the underside of the plate and the sides of the member 11. A similar shaft 53 is mounted upon the frame 11 rearwardly of the shaft 49 in a similar fashion, being carried within a pillow block bearing 54 supported upon a plate 55 and gussets 56 substantially identical to the plate 51 and gussets 52. The ends of the shafts 53 and 49 are connected through an override coupling 57 to be described hereinafter. A beveled gear 58 is secured upon the rearward end of the shaft 53 and meshes with a similar beveled gear 59 secured upon the shaft 37. In this manner, rotation of the connection 47 by means of the power take-off of the tractor causes rotation of the shafts 49 and 53, and due to the gears 58 and 59, rotation of the shaft 37 and the stub shafts 38. The speed of rotation of the shafts 38 may vary over a considerable range in accordance with the particular speed or arrangement of the driving connection of the power take-off. However, a speed of rotation of approximately 450 to 550 revolutions per minute has been found quite suitable and provides a device having the desired efficiency of cutting action. Obviously, various other cutting speeds may be employed.

The override connection 57 mounts to a ratchet drive and permits the cutter assembly to continue rotating after rotation of the driving connection 47 has ceased or has been cut off by stopping of the power take-off of the tractor. Such a situation often occurs when the operator of the device has reached the end of a crop row and stops his tractor in order to turn the same or wishes to cease the chopping operation entirely. The cutter assemblies represented by the shafts 38, the yokes 40 and the cutter blades 44, are relatively heavy and upon reaching a speed of 400 or 500 revolutions per minute develop a considerable degree of inertia or kinetic energy. Obviously, such inertia represents a considerable force tending to maintain or continue revolutions of the cutter assemblies and a sudden stoppage of the driving connection 47 would place a severe and quite probably destructive load upon the driving shafts leading to said cutter assemblies. For this reason, the override connection 57 is provided to allow the cutter assemblies to continue their rotation after the driving connection has been stopped, such rotation continuing until the inertia of the assemblies has been dissipated and they may come to rest without placing undue strains on any of the portions or elements of the device.

The connection 57 includes a hub 60 pinned or otherwise secured to the rearward end of the shaft 49 and engaging within a bell 61, pinned or otherwise secured, upon the forward end of the shaft 53. The forward extremity 62 of the shaft 53 telescopes the hub 60 so as to lend rigidity to the connection. A plurality of teeth 63 are formed on the inner surface of the bell 61 and are adapted to be engaged by a spring-pressed ratchet 64 carried by the hub 60. In this manner, as shown in Fig. 6 of the drawings, the hub may transmit counter-clockwise rotative force to the bell 61, but at the same time the bell may override the hub by causing the teeth 63 to override and depress the pawl 64. Obviously, any other suitable type of ratchet drive or ratchet connection may be provided between the shafts 49 and 53 to permit the continued rotation of the shaft 53 after the rotation of the shaft 49 has ceased or has been stopped.

It is desirable to enclose to some extent the cutter assemblies to prevent the pieces of standing crop which are cut by the blades 44 from being thrown into the air or upon the operator of the tractor which is drawing the cutting device. For this purpose, an elongate rectangular housing 65 overlies and encloses the upper portion of each of the cutter assemblies. The housings 65 have open bottoms 66 through which the cutter assemblies revolve, and have the forwardmost portion of their upper walls 67 directed downwardly at an angle as shown at 68 in Fig. 1. This downwardly directed portion 68 is sufficient to protect the operator of the tractor to which the device is connected and to prevent his being struck by small sticks or stones which may be picked up by the cutter blades 44 and thrown tangentially outwardly therefrom. The forward end 69 of each housing, with the exception of the depending portion 68, is open to permit the egress of a portion of the plant cuttings and at the same time permitting visual inspection by the operator of the device of the cutting action being achieved by the blades 44.

The housings 65 may be constructed an any desired manner, being preferably formed of sheet metal plates 70 supported upon an angle iron frame 71. A suitable transverse supporting member 72 extends across the forward ends of both of the housings and is secured to the upper side of the central frame member 11 so as to provide an adequate support for the forward portions of said housings. Similar, short supporting members 73 extend between the contiguous inner sides of the housings adjacent the plate 34 and rest upon and are secured to the upper side of the member 11. The transverse frame member 13 carries a plurality of upstanding brackets 74 secured to its forward side, said brackets having their upper ends secured to the lower and rear portions of the frames 71 of the housings.

For controlling the spreading and scattering of the chopped plants, each of the housings 65 carries a short depending skirt 75 at the rearward end of the open bottom 66 of said housings. Similar skirts 76 depend from and are pivoted to the upper edges of the open fronts 69 of the housings and have their upper ends 77 connected to a suitable adjusting means 78 whereby the angular position of the skirts 76 with respect to the housings may be adjusted to vary the deflecting action of such skirts. It has been found that such adjustment is desirable with different crops to allow a maximum of broadcasting or scattering of the cut pieces of the plants while at the same time insuring adequate protection for the operator of the device.

The operation of this chopping device is believed to be apparent and obvious from the foregoing description. The connection 12 is secured to the rear end of a suitable farm tractor (not shown) and the driving connection 47 properly engaged with the power take-off of such tractor. The levers 25 may be adjusted to regulate the cutting height of the blades 44 in accordance with the crop and soil conditions at hand and the device placed in operation.

As the machine is drawn forwardly along the crop rows, the cutter assemblies, being rotated by the relatively high speed of the power take-off of the tractor, thoroughly chop and shred the standing crop rows as the device passes thereover. Due to the speed of rotation of the assemblies, the cut pieces of plants are scattered in a broadcast and uniform manner over the surface of the ground where they can be later turned under to function as fertilizing material. It is pointed out that the device is equally efficient with respect to dead or dry crops as well as green crops. This is of particular importance since a green crop which can be cut and scattered immediately after harvesting is considerably more valuable as fertilizing material than a dead or dried crop, and it is a particular advantage of this device that it is capable of cutting up and scattering such green live plants immediately after harvesting of said plants.

There is considerable effort at the present time being directed toward encouraging farmers and growers of cotton and similar crops to conserve insofar as possible the fertilizing value of the stalks and stems of the crops by plowing them under while green. It has been found that much greater benefits are realized by thoroughly cutting and shredding the plant stalks immediately after harvesting of the crop. Obviously, if this can be done while the stalks remain standing in the field, considerable economic advantages result.

This invention realizes these benefits without being excessively expensive or complicated. The green plant stalks, which are very difficult to cut with previous machines, are thoroughly cut and shredded, and are scattered or broadcast over the field so that they may be turned under wtih the usual farm implements if desired. Also, the condition of the soil, whether wet or dry, does not affect the operation of this invention so long as the ground is not too muddy to support this device. The stalks are cut equally well under wet weather conditions as dry so that the operator may cut and scatter the plant stalks immediately after the crop has been harvested regardless of weather or soil conditions.

In Figs. 7 through 10, is shown a modified form of this stalk cutting device. This modified form is very similar to the first form described and is identical thereto insofar as the cutter assemblies and the driving connections are concerned. The same numerals have been employed to designate like portions of the two forms. The primary and principal differences between the first form described and the modified form reside in the construction of the supporting frames and the adjustable wheel mountings employed in conjunction with said supporting frame.

In the modified form, the central frame member 11 is replaced with a similar member 80 which may be formed of a unitary, elongate section of pipe, or of other suitable material. This central frame member 80 terminates at a point spaced at a short distance rearwardly of the shaft 37 and carries an upright vertical frame member 81 welded or otherwise suitably secured to its rearward end. The vertical frame member 81 extends upwardly to a point adjacent the upper surface of the housings 65 and receives and supports the central portion of an elongate, transverse, cross frame member 82. The cross frame member 82 extends parallel to the shaft 37 and immediately above the upper surfaces of the housings 65 with its outer ends being disposed immediately outward of the outer side walls of said housings. The member 82 is preferably welded to the upper end of the vertical member 81 and carries a pair of depending side frames 83 also preferably welded to the outer ends of said member 82. The depending side frames or legs 83 extend downwardly and slightly forwardly from the outer ends of the member 82, one of said legs being disposed adjacent and parallel to the outer side wall of each of the housings 65.

Suitable supporting brackets 84, similar to the brackets 15, are positioned upon the lower extremities of the depending side frames or legs 83, each of the brackets receiving a wheel support 85 similar in all respects to the supports 18 previously described. Any desirable type of ground wheels 86 are carried upon the lower ends of the support 85 in a fashion similar to the wheels 23.

For adjusting the supports 85 and thereby regulating the vertical spacing of the cutting device above the ground surface, an elongate lever 87 is welded or otherwise suitably secured to the upper ends of each of the supports 85 whereby swinging of said levers in a vertical arc will cause swinging of the supports about the brackets 84 with the consequent vertical adjustment of the ground wheels 86. The levers 87 carry the usual handles 88 and triggers 89 linked by rods 90 to any desirable type of pawl 91. The pawls 91 engage ratchets 92 secured to and carried by the lower ends of the legs 83. Since the latter are rigidly secured and connected through the members 81 and 82 to the central frame member 80, adjustment of the levers with respect to the ratchets will result in selective positioning of the supports 85 with respect to the frame of the cutting device and thus result in vertical adjustment of the ground wheels with respect to said frame. For counteracting the tendency of the supports 85 to swing upwardly under the influence of the weight of the chopping or cutting device, a suitable coiled spring 93 is stretched between the lower end of each of the ratchets 92 and the medial portion of each of the levers 87. As will be obvious from an examination of Fig. 7, the force exerted by the springs 93 tends to swing the levers 87 downwardly thus swinging the support 85 downwardly with respect to the frame members. In this manner, the weight of the cutting device is to a large degree overcome so that one person may effect vertical adjustment of the ground wheels with respect to the frame with relative ease and without undue physical exertion.

The remaining elements of this modified form of the cutting device contemplated by this invention are substantially identical to like elements previously described in connection with the first form of the invention as indicated in the drawings by the use of the same numerals.

The operation of this modified form is the same as the operation of the first form, and it is not considered necessary to repeat this material at this point.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In combination with a power-driven vehicle having a power take-off, a cutting device for standing crops including, an elongate tubular frame member adapted to have one end attached to a vehicle, a laterally-extending transverse frame member secured to the other end of the first-named frame member and projecting from both sides thereof, side frames secured to the outer ends of the transverse frame member, ground wheels carried on the projecting ends of the side frames, a transverse shaft carried by the first-named member and extending beyond both sides thereof, cutter reels secured upon the extending portions of the shaft with the side frame so as to cut swaths parallel to the first-named frame member, a driving connection between the power take-off of the vehicle and the shaft, a ratchet in the driving connection, means for adjusting the ground wheels to regulate the height of the frame members and the reels above the surface of the ground, housings enclosing the upper portions of the reels, and adjustable deflector skirts depending from the forward portions of the housings.

2. A pull-type cutting device for simultaneously cutting two adjacent rows of standing crops including, an elongate central frame member adapted to be attached at its front end to a vehicle and to extend substantially longitudinally of the path of travel of the vehicle substantially between the two adjacent crop rows, a transverse frame member carried by the central frame member, ground wheels supporting the central frame member, the wheels being pivotally mounted to support the outer ends of the transverse frame member, a rotatable cutting structure having cutting blades carried by the central frame member and positioned to cut the adjacent crop rows along each side of the central frame member, said structure having an axis of rotation and being positioned with its axis of rotation at right angles to the longitudinal axis of the central frame member, the transverse frame member being disposed adjacent a vertical transverse plane passing along the axis of rotation of the cutting structure whereby the area in front of the cutting blades is unobstructed and the crop rows may enter the cutting area in upright positions, a driving connection for rotating the cutting structure arranged to be connected with the vehicle for driving, and a ratchet in the driving connection.

JAMES B. JARMIN.

References Cited in the file of this patent

UNITED STATES PATENTS

| Number | Name | Date |
|---|---|---|
| 516,444 | Nehrmeyer | Mar. 13, 1894 |
| 527,302 | Vsry | Oct. 9, 1894 |
| 630,947 | Ferrell | Aug. 15, 1899 |
| 974,219 | Werner | Nov. 1, 1910 |
| 1,144,013 | Weitman | June 22, 1915 |
| 1,286,816 | Smith | Dec. 3, 1918 |
| 1,744,479 | Lindgren et al. | Jan. 21, 1930 |
| 2,250,103 | Locke et al. | July 22, 1941 |
| 2,279,652 | Beard | Apr. 14, 1942 |
| 2,335,112 | Fulks | Nov. 23, 1943 |
| 2,465,488 | Sears et al. | Mar. 29, 1949 |